(12) United States Patent
Larsson et al.

(10) Patent No.: US 12,335,352 B2
(45) Date of Patent: Jun. 17, 2025

(54) USING PROXY SERVICES FOR DEPENDENCIES IN DISTRIBUTED COMPUTING SYSTEMS

(71) Applicant: RED HAT, INC., Raleigh, NC (US)

(72) Inventors: Alexander Larsson, Hägersten (SE); Pierre-Yves Chibon, Saint-Pol-de-Léon (FR); Daniel J. Walsh, Wells, ME (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 18/357,355

(22) Filed: Jul. 24, 2023

(65) Prior Publication Data

US 2025/0039273 A1 Jan. 30, 2025

(51) Int. Cl.
*H04L 67/562* (2022.01)
(52) U.S. Cl.
CPC .................................. *H04L 67/562* (2022.05)
(58) Field of Classification Search
CPC ...................................................... H04L 67/562
See application file for complete search history.

(56) References Cited

U.S. PATENT DOCUMENTS

| | | | |
|---|---|---|---|
| 11,469,944 B1 | 10/2022 | Lindolm et al. | |
| 2020/0137185 A1* | 4/2020 | Parekh | G06F 9/5061 |
| 2021/0314411 A1* | 10/2021 | Madden | H04L 12/4633 |
| 2022/0171648 A1* | 6/2022 | Rodriguez | G06F 9/45533 |

FOREIGN PATENT DOCUMENTS

| | | | |
|---|---|---|---|
| CN | 109597626 | 4/2019 | |
| CN | 112416524 | 2/2021 | |
| EP | 3668174 A1 * | 6/2020 | ............ H04L 67/10 |
| EP | 3668174 B1 * | 8/2023 | ............ H04L 67/10 |

OTHER PUBLICATIONS

Juggery, Luc, "K8s: A Closer Look at Kube-Proxy", Jan. 13, 2021, https://betterprogramming.pub/k8s-a-closer-look-at-kube-proxy-372c4e8b090, 17 pages.
McCarty, Scott, "A Practical Introduction to Container Terminology", Red Hat, Inc., Feb. 21, 2018, https://developers.redhat.com/blog/2018/02/22/container-terminology-practical-introduction#pet_containers, 27 pages.
Breard, Ben, "Manage Containers at the Edge with Linux", Red Hat, Inc., Sep. 16, 2022, https://www.redhat.com/sysadmin/linux-edge-container-management, 8 pages.

* cited by examiner

*Primary Examiner* — James E Springer
*Assistant Examiner* — Patrick F Ngankam
(74) *Attorney, Agent, or Firm* — Dority & Manning, P.A.

(57) ABSTRACT

A method includes intercepting, by a proxy service running on a first node of a distributed computing system, a first request for a first service running on the first node; determining, by the proxy service, that the first service is dependent on a second service running on a second node of the distributed computing system; responsive to determining that the first service is dependent on the second service, invoking, by the proxy service, the second service running on the second node; receiving, by the proxy service, a first response from the second service; and transmitting, by the proxy service, to the first service, the first response received from the second service.

17 Claims, 5 Drawing Sheets

USING PROXY SERVICES FOR DEPENDENCIES IN DISTRIBUTED COMPUTING SYSTEMS

TECHNICAL FIELD

The present disclosure is generally related to computing systems, and more particularly, to using proxy services for dependencies in distributed computing systems.

BACKGROUND

Distributed computing systems include multiple services. Some services may be independent of other services, and may be accessed without knowledge of its underlying platform implementation. Some services may invoke other services during processing. Invoking a service refers to causing the service to be enabled to perform an action specified by a request. For example, a travel agent service may invoke a flight booking service and a hotel booking service. In turn, the flight booking service and hotel booking service may each invoke a credit card service.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein are methods and systems for using proxy services for dependencies in distributed computing systems. A distributed computing system can include multiple nodes, each running one or more software components. The nodes in a distributed computing system can be physically close together and connected by a local area network, or can be geographically distant and connected by a wide area network.

In a computer system, a dependency between two processes can include a positive or negative requirement dependency as well as an ordering dependency. In the positive dependency, a first process requires a second process, while in the negative dependency, a first process conflicts with a second process. In the ordering dependency, a first process precedes or succeeds a second process. In most cases as used in the present disclosure, a dependency can be identified between a first process of the computer system and a second process of the computer system if the first process, in order to perform an action, needs a result of another action performed by the second process. That is, in the present disclosure, the first process is dependent on the second process means that the first process requires the second process and the first process succeeds the second process. However, when a second process does not reside on the same computer system as the first process that invokes the second process, invocation of the second process would involve inter-node communications.

The dependency situation can occur in some computer systems that include a system and service manager (e.g., systemd). The system and service manager can run as the first process on boot and start the rest of the system and can keep a configuration file that encodes information about a process controlled and supervised by the system and service manager, and such process can be considered as a service. A service refers to one or more processes performed to fulfill a computing functionality. The system and service manager can identify the dependencies between the services.

In some implementations, when a first service invokes a second service, but the first service runs on a first node in the distributed computing system, and the second service runs on a second node in the distributed computing system, the system and service manager of the first node can connect to the second node (e.g., over a secure session, such as a Secure Shell Protocol (SSH) session) to start, stop, or invoke the second service. However, using the connection over the SSH session as described above may involve a user interaction.

Further, SSH is a cryptographic network protocol for operating network services securely over an unsecured network, which allows communication without limiting to a specific interface type. This can be problematic for some implementations, such as in a system operating in an isolated environment (e.g., in an autonomous driving system). For example, a system of an autonomous vehicle may include multiple nodes, and each node runs some services. When various services running on different notes communicate within the system, SSH would not be preferred because a running SSH daemon can potentially be exploited for facilitating undesired communications, including communications from outside of the system.

Aspects of the present disclosure address the above and other deficiencies by using proxy services for invoking services with dependencies among multiple nodes in a distributed computing system. In a distributed computing system, a node ("local node") can receive a request for a service ("local service") running on the node. The local service may have a dependency on another service ("remote service") that runs on another node ("remote node") in the distributed computing system. A proxy service refers to a service provides a gateway between the local service and the remote service and acts as an intermediary between the local service requesting data and the remote service providing the data.

A controller running on the local node can determine that the local service being called requires invoking the remote service and identify the remote service running on the remote node. A controller running on the local node refers to a hardware device and/or a software component that manages the data flow within the local node and from/to the remote node. For example, the controller running on the local node may monitor service calls and log the service calls including the identities of services with dependency ("dependency log"). In another example, the controller running on the local node may access to a data store to obtain the identities of services with dependency.

Upon identifying a dependency of the local service upon the remote service running on the remote node, the controller running on the local node can connect to a controller running on the remote node. The connection can be provided through an application programming interface (API). The API specifies a way to create and use the connection and includes a set of defined rules that enable different applications to communicate with each other, including the rules of data transfer and data translating. The controller running on the local node can create a proxy service functioning as a proxy of the remote service. The proxy service on the local node can send, from the controller running on the local node, via the API, to the controller running on the remote node, a request to start, stop, or invoke the remote service and requesting specific data associated with the remote service (e.g., the specific data resulted from performing an action by the remote service). The controller running on the remote node can, responsive to receiving the request, start, stop, or invoke the remote service and perform the action to obtain the specific data associated with the remote service. In some implementations, the controller running on the remote node can send, to the controller running on the local node, a notification regarding the started, stopped, or invoked state of the remote service. In some implementations, the controller running on the remote node can send, to the controller running on the local node, the requested specific data, which can function as synchronization between the remote service and the proxy service. In some implementations, the proxy service created by the controller running on the local node can function as receiving the specific data and relaying the data to the local service running on the local node.

In some implementations, the proxy service running as a background process (e.g., a daemon) on one node is capable to connect with another daemon running on another node, and can handle the request for the start, stop, invoke of the service running on the node. In some implementations, each service may be a service controlled and supervised by a system and service manager.

Advantages of the present disclosure include provides an automatic invocation of a remote, required service running on a remote node upon detecting a need from a local service. Also, the communication using controllers running on different nodes can be specific to a type of interface, which may prevent communication through other types of interface and can enhance the communication safety and efficiency. Further, the communication between nodes does not requires a central unit for connection.

Figure 1:
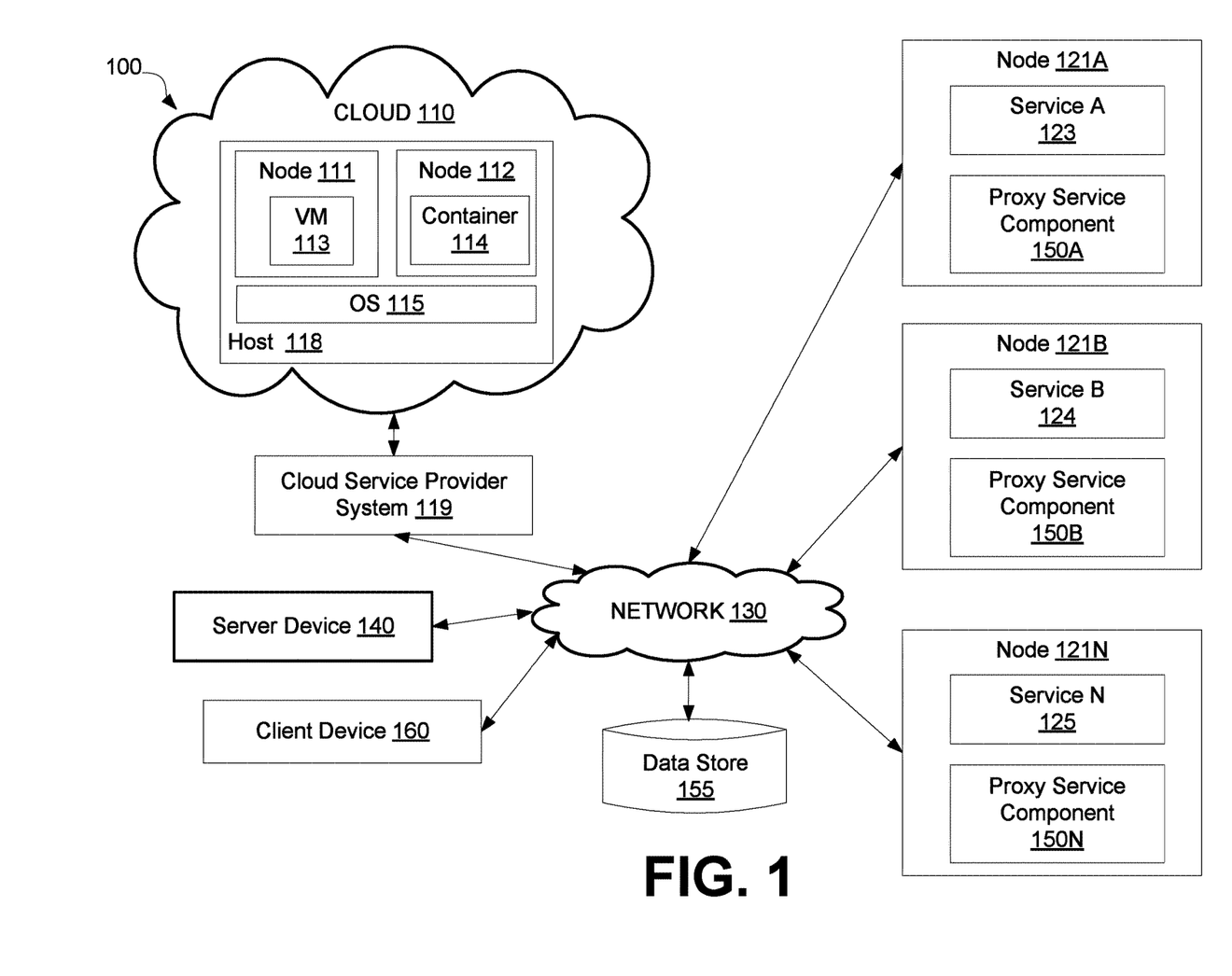
FIG. 1 depicts a high-level component diagram of an example of a computer system architecture, in accordance with one or more aspects of the present disclosure.

FIG. 1 is a block diagram of a distributed computing system 100 in which implementations of the disclosure may operate. In some implementations, the distributed computing system 100 may include a service oriented architecture (SOA). A service oriented architecture (SOA) is an information system architecture that organizes and uses distributed capabilities (services) for one or more applications. SOA provides a uniform means to offer, discover, interact with and use capabilities (services) distributed over a network. Through the SOA, applications may be designed that combine loosely coupled and interoperable services.

As shown in FIG. 1, the distributed computing system 100 includes one or more nodes 121A-121N. A "node" providing computing functionality may provide the execution environment for a service of the distributed computing system. Each node 121A-121N can include one or more services (e.g., service A 123, service B 124, service N 125) connected via a network 130. The network 130 may be a private network (e.g., a local area network (LAN), a wide area network (WAN), intranet, or other similar private networks) or a public network (e.g., the Internet). In one embodiment, the network 130 includes an enterprise service bus (ESB), which is an event-driven and standards-based messaging engine that provides services for more complex architectures. The ESB provides an infrastructure that links components of the distributed computing system 100 to enable distributed applications and processes. The ESB may be implemented to facilitate an SOA. In one embodiment, the ESB is a single bus that logically interconnects all available services and clients. Alternatively, the ESB may include multiple busses, each of which may logically interconnect different services and/or clients.

In some implementations, services 123, 124, 125 may be discretely defined sets of contiguous and autonomous functionality (e.g., business functionality, technical functionality, etc.). Services 123, 124, 125 may be resident on personal computers (PC), servers, routers, etc. Each service 123, 124, 125 may represent a process, activity or other resource that can be accessed and used by other services or clients on network 130.

In some implementations, services 123, 124, 125 may be implemented using an object oriented programming (OOP) environment. In object oriented programming, a class represents an abstract data structure that provides a blueprint that specifies behaviors (methods) and state variables (fields). An object is an instance of a class that can be created (instantiated) by assigning values to the state variables. Each object can be viewed as an independent machine or actor with a distinct role or responsibility. In one embodiment, some services 123, 124, 125 are objects. Alternatively, services 123, 124, 125 may include multiple objects. Each object may include a method or methods, each of which performs a specific task or tasks for the object. In some implementations, services 123, 124, 125 may also be implemented using procedural programming, functional programming, or other programming methodologies. Such services 123, 124, 125 may be and/or include functions, procedures, or other programming constructs.

In some implementations, each service 123, 124, 125 may have dependency with other services. In an example for an automotive vehicle driving, services may include, for example, an "auto-pilot" service that provides automatically driving the vehicle, detecting pedestrians when reversing the vehicle, providing video streaming from various cameras installed on the vehicle, etc. In one example, the service detecting pedestrians when reversing the vehicle may depend on the service providing video streaming from various cameras. The service providing video streaming may provide image data to the service detecting pedestrians, and the service detecting pedestrians may use the image data to detect the penetrations. In another example, the "auto-pilot" service may depend on the service detecting pedestrians. The service detecting pedestrians may provide detection data to the "auto-pilot" service, and the "auto-pilot" service may use the detection data to change the motion of the vehicle. Each such service may be autonomous from the other services, and may be remote from one another (e.g., running on different nodes) and have different platform implementations. These services may be combined and used by one or more applications to manage orders.

In some implementations, each service 123, 124, 125 may be a service controlled and supervised by a system and service manager. In some implementations, each node 121A-121N include a system and service manager. In some implementations, the system and service manager provides a suite of basic processes running for a Linux system and can run as the first process on boot and start the rest of the system. In some implementations, the system and service manager provides a dependency system between various entities of the system. These entities encapsulate various objects that are relevant for system boot-up and maintenance, and can be configured in configuration files. The configuration files can be created automatically from other configuration files or dynamically from system state or programmatically at runtime.

Each node 121A-121N may implement a proxy service component (e.g., proxy service component 150A-150N), which is capable to connect to each other running on different nodes for a proxy service for start, stop, invoke of a required service. In some implementations, the connection process between the proxy service components may run as a daemon. A daemon provides functionality to other processes, and can be implemented following various scheme (e.g., in SysV Unix system, or in systemd init system). In some implementations, the proxy service component running on one node is capable to detect a start of a service, determine a required service associated with the service, connect with another proxy service component running on another node having the required service, request the start, stop, invoke of the required service running on another node as well as the specific data associated with the required service. The proxy service component running on another node is capable to receive a request from the proxy service component and to start, stop, invoke the required service to perform an action according to the request to obtain the specific data associated with the required service.

For example, the proxy service component 150A may receive a request for the service 123, determine the service 123 as a service dependent on the service 124, connect with the proxy service component 150B running on node 121B having the service 124, request the start, stop, invoke of the service 124 running on node 121B as well as the specific data from the service 124; and the proxy service component 150B is capable to receive a request from the proxy service component 150A and to start, stop, invoke the service 124 and to perform an action according to the request. As such, the proxy service component 150A-150B provide a proxy service, running on node 121A, functioning as a proxy of the required service 124, and providing a gateway between the service 123 and the service 124.

Specifically, the proxy service component running on a node can monitor calls to a service. The proxy service component can determine that a call is generated by a service for another service, and thus, determines that dependencies exist for the service. In some implementations, the proxy service component 150A-150N logs the service call including the identities of the service being called and the service making the call as a dependency log. The identity of a service may include, for example, a process identifier (e.g., a unique java virtual machine (JVM) in Java, or a unique Unix process in C++ on Unix) of the service or of a process on which the service is running. The identity may also include an identification of an object, procedure, function, etc. running within a process. The identity may further include specific components of an object, procedure, function, etc. For example, in services constructed using OOP, the identity may include an object and/or a method within the object.

In some implementations, the proxy service component 150A-150N can access a data store 155. The data store 155 may be a database, file system, or other data arrangement on a volatile storage (e.g., random access memory (RAM), Flash, etc.) and/or a nonvolatile storage (e.g., hard disk drive, nonvolatile RAM (NVRAM), etc.). The data store 155 may be local to a machine on which the proxy service component 150A-150N runs. Alternatively, the data store 155 may be external to the node on which the proxy service component 150A-150N runs, and connected with the node directly or via network 130. In one embodiment, the data store 155 connects with multiple nodes, each of which runs a distinct service or services (e.g., service 123, 124, 125) and include a data structure including multiple record of the dependency. For example, each record of the data structure may include identifiers of the service being called and the service making the call and a description of the dependency between the services. For example, the data store 155 may be a dependency database or a file system on which all proxy service components 150A-150N may store dependency logs (not shown). Preferably, each of the dependency logs shares a file format, so that they can all be easily accessed by services of the distributed computing system 100. In another example, multiple proxy service components 150A-150N write to a shared dependency log on a shared data store 155.

In one embodiment, the proxy service component 150A-150N transmits a description of the detected dependency to a dependency tracking service that maintains a dependency map of the distributed computing system 100. In one embodiment, the proxy service component 150A-150N maintains the dependency map in the data store 155, which may be internal or external to a machine on which proxy service component 150A-150N runs. The proxy service component 150A-150N may use the dependency logs (e.g., one or more flat files), received dependency reports, and/or a dependency database to build the dependency map that is stored in the data store 155 and can be accessible to each proxy service component 150A-150N. In one embodiment, the proxy service component 150A-150N retrieves dependency logs from one or more locations. In another embodiment, the proxy service component 150A-150N retrieves invocation information from a dependency database. In yet another embodiment, the proxy service component 150A-150N receives invocation reports from services.

The proxy service component 150A-150N can also track dependencies between specific components within services. For example, the proxy service component 150A-150N may track the dependency between a first service and a specific method or object within a second service, for example, by determining that a call is generated by the first service for the specific method or object within the second service. The proxy service component 150A-150N adds a new dependency to, or updates an existing dependency on, the dependency map each time a service is detected to invoke another service (or a specific method or object within another service). If it is the first time that the invoking service has called the invoked service, a new dependency is added. Otherwise, an existing dependency is updated.

In one embodiment, the proxy service component 150A-150N implements an administrative view of the dependency map. The administrative view allows the services to be represented on the dependency map using human understandable service names, service types, and/or service descriptions. Implementing the administrative view may involve determining a service type for each service, and applying a human understandable service name based on the service type. The service type and/or service name may be determined by querying the service and/or by querying a service registry on the distributed computing system 100. Alternatively, service types and/or service names may be input by a user of the proxy service component 150A-150N. Imposing an administrative view may also include adding a service description to the services. As with the service name and service type, the service description may be determined by querying a service or service registry and/or based on input received from a user.

The proxy service component running on a node can connect to one or more proxy service component running on other node(s) upon determining that a service running on the same node is dependent on another service running on the other node(s). The connection can be provided through an application programming interface (API) implemented by the proxy service component. For example, the local proxy service component running on a first node can connect with the remote proxy service component running on a second node, where the first node provides a first service that invokes a second service running on the second node.

In some implementations, the proxy service component can send, via an API, to the other nodes, a request to start, stop, invoke the required service running on the remote node. For example, the local proxy service component running on a first node can send, via the API, to the remote proxy service component, a request to start, stop, invoke the second service running on the second node.

In some implementations, the remote proxy service component running on the other node can, responsive to receiving the request, start, stop, invoke the required service running on the other node according to the request. For example, when the request is a request to invoke the second service, the remote proxy service component invokes the second service in a manner specified in the request.

In some implementations, the remote proxy service component running on the other node can send, to the local proxy service component, a notification regarding the started, stopped, or invoked state of the second service. In some implementations, the remote proxy service component running on the other node can send, to the local proxy service component the requested specific data, which can function as synchronization between the second service and the proxy service. In some implementations, the proxy service created by the local proxy service component can function as receiving the specific data and relaying the data to the service running on the node.

In some implementations, the distributed computing system 100 may be used in a containerized computing services platform. A containerized computing services platform may include a Platform-as-a-Service (PaaS) system, which provides resources and services (e.g., micro-services) for the development and execution of applications owned or managed by multiple users. A PaaS system provides a platform and environment that allow users to build applications and services in a clustered compute environment (the "cloud"). Although implementations of the disclosure are described in accordance with a certain type of system, this should not be considered as limiting the scope or usefulness of the features of the disclosure. For example, the features and techniques described herein can be used with other types of multi-tenant systems and/or containerized computing services platforms.

In some implementations, the distributed computing system 100 includes a cloud-computing environment 110 (also referred to herein as a cloud(s)) that includes nodes 111, 112 to execute applications and/or processes associated with the applications. In some implementations, the node may include a virtual machine (VMs 113) that is hosted on a physical machine, such as host 118 implemented as part of the clouds 110. For example, nodes 111 and 112 are hosted on physical machine of host 118 in cloud 110 provided by cloud provider 119. When nodes 111 and 112 are implemented as VMs, they may be executed by operating systems (OSs) 115 on each host machine 118. In some implementations, nodes 111 and 112 may additionally or alternatively include a group of VMs, a container (e.g., container 114), or a group of containers to execute functionality of the PaaS applications. While one cloud provider system have been depicted in FIG. 1, in some implementations more or fewer cloud service provider systems (and corresponding clouds) may be present.

In some implementations, the host machine 118 can be located in data centers. Users can interact with applications executing on the cloud-based nodes 111, 112 using client computer systems (not pictured), via corresponding client software (not pictured). Client software may include an application such as a web browser. In other implementations, the applications may be hosted directly on host 118 without the use of VMs (e.g., a "bare metal" implementation), and in such an implementation, the hosts themselves are referred to as "nodes".

In various implementations, developers, owners, and/or system administrators of the applications may maintain applications executing in clouds 110 by providing software development services, system administration services, or other related types of configuration services for associated nodes in cloud 110. This can be accomplished by accessing cloud 110, using an application programmer interface (API) within the applicable cloud service provider system 119. In some implementations, a developer, owner, or system administrator may access the cloud service provider system 119 from a client device (e.g., client device 160) that includes dedicated software to interact with various cloud components. Additionally, or alternatively, the cloud service provider system 119, 129 may be accessed using a web-based or cloud-based application that executes on a separate computing device (e.g., server device 140) that communicates with client device 160 via network 130.

Client device 160 is connected to host 118 in cloud 110 and the cloud service provider systems 119 via a network 130. Each client 160 may be a mobile device, a PDA, a laptop, a desktop computer, a tablet computing device, a server device, or any other computing device. Each host 118 may be a server computer system, a desktop computer, or any other computing device. The cloud service provider systems 119 may include one or more machines such as server computers, desktop computers, etc. Similarly, server device 140 may include one or more machines such as server computers, desktop computers, etc. While aspects of the present disclosure describe implementations in a PaaS environment, it should be noted that in other implementations, the present disclosure can also be implemented in an Infrastructure-as-a-Service (IaaS) environment associated with a containerized computing services platform. The functionality of proxy service component will now be described in further detail below with respect to FIG. 2

Figure 2:
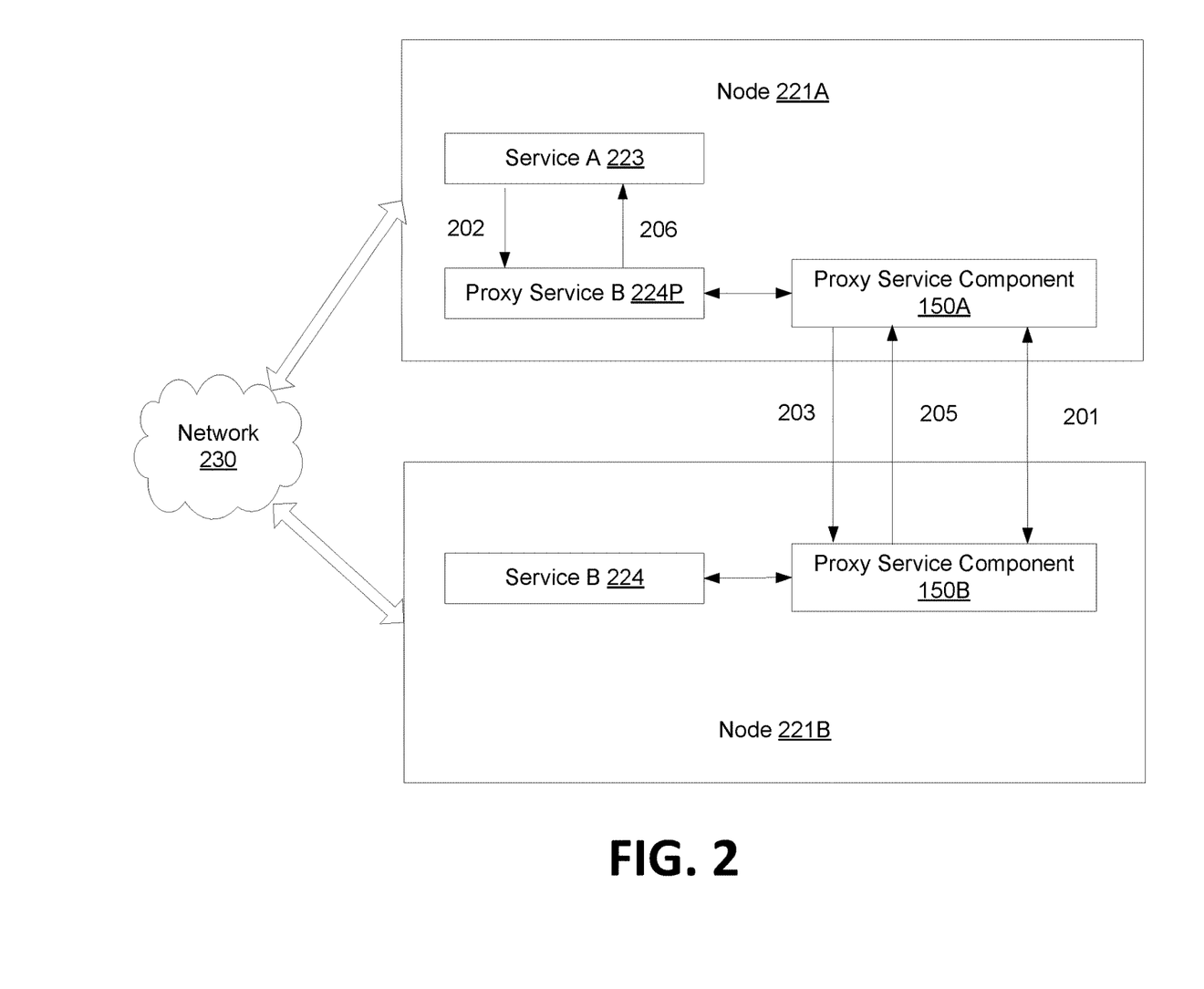
FIG. 2 depicts a component diagram of an example of implementing a proxy service, in accordance with one or more aspects of the present disclosure.

FIG. 2 illustrates an example system 200 that implements proxy service components 150A and 150B. The system 200 includes a collection of nodes (e.g., nodes 221A, 221B) connected via a network 130. Node 221A includes a proxy service component 150A, and node 221B includes a proxy service component 150B.

Node 221A may receive a call for service A 223 (to invoke service A 223), and may find in the service definition file (e.g., in the data store) that service A requires a proxy service B (i.e., the dependency information of service A). Node 221A may start the proxy service B 224P, which in turn, invokes the proxy service component 150A to connect to node 221B for service B. Specifically, the service A 223 may send, to the proxy service B 224P, a request 202 for specific data associated with the service B 224. The proxy service B 224P may relay the request through the proxy service component 150A. The proxy service component 150A may identify that the requested service runs on node 221B and automatically make a connection 201 with the proxy service component 150B included in the node 221B. The proxy service component 150A may connect the proxy service component 150B via the API. Specifically, the proxy service component 150A may send, to the proxy service component 150B, via the API, a request 203 to invoke the service B 224 as well as requesting specific data associated with the service B 224. Responsive to receiving the request 203, the proxy service component 150B can invoke the service B 224 and request specific data associated with the service B 224. For example, responsive to receiving the request, the service B 224 performs an action according to the request and generate a response including the specific data as requested, and have proxy service component 150B relay the response. The proxy service component 150B thus send the response 205 including the specific data to proxy service component 150A. In some implementations, the response 205 may include a notification (e.g., through the connection 201) regarding the state (e.g., being invoked) of the service B 224. Responsive to receiving the response 205, the proxy service component 150A may relay the information received from the response 205 and send it to the proxy service B 224P. The proxy service B 224P may mark itself as "running" and may send a response 206 with the specific data to the service A 223. The service A 223 may then generate a response to the call to the service A 223. The response to the call may include resulted data from performing an action by the service A 223, an indication of status of an action performed by the service A 223, etc.

As illustrated above, node 221A handles the call for service A, retrieve the dependency information of the service A, start the proxy service B, and activate the proxy service component 150A to make connections. However, in some implementations, the above functions provided by node 221A can be integrated and provided by the proxy service component 150A such that it provides a proxy service B 224P that serves as a proxy for the service B 224, retrieve the dependency information of the service A, start the proxy service B, and/or be activated to make connections.

Figure 3:
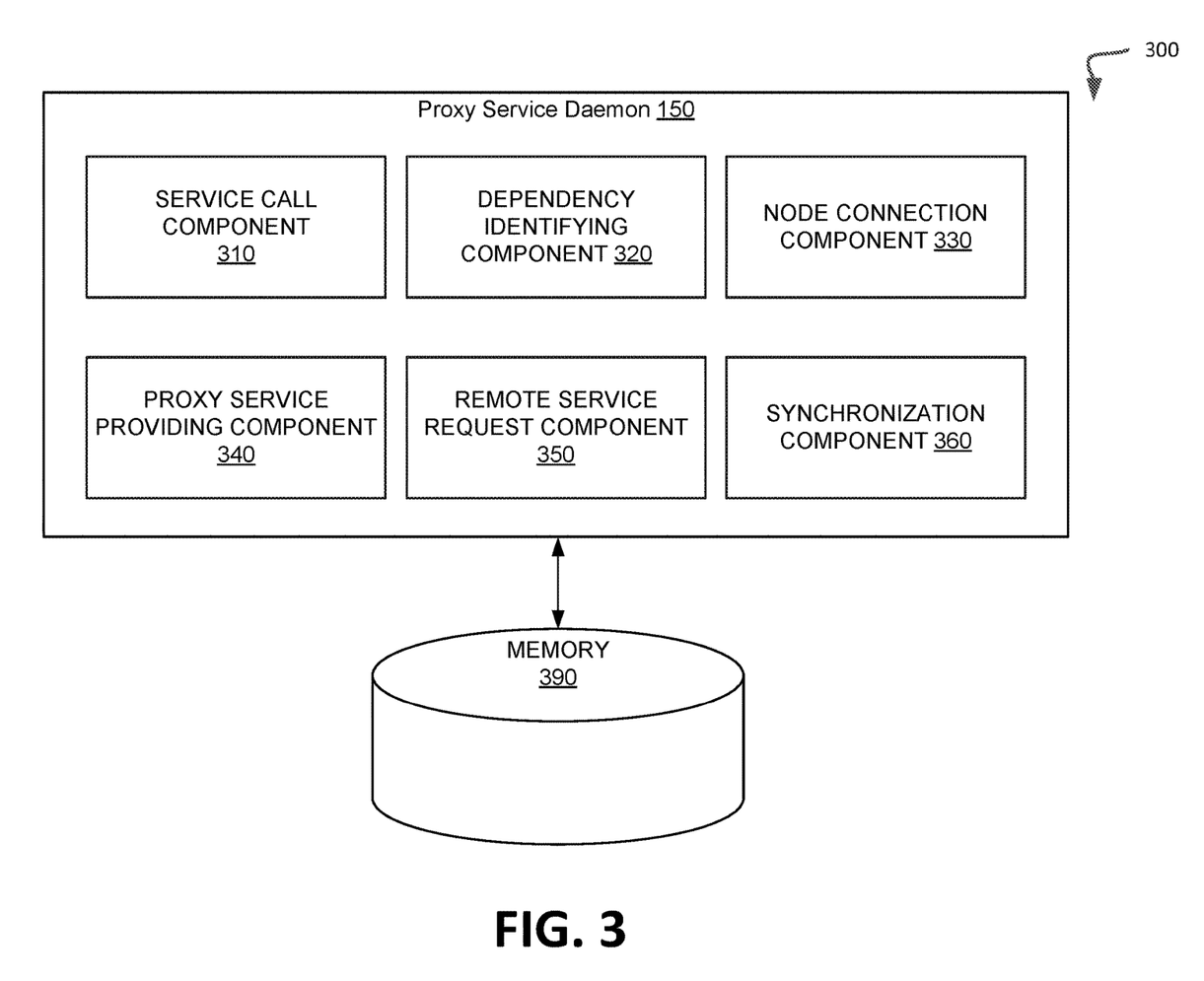
FIG. 3 depicts an example of a block diagram of a computer system, in accordance with one or more aspects of the present disclosure.

FIG. 3 depicts a block diagram illustrating an example 300 of a computer system in accordance with some implementations of the disclosure. The proxy service component 150 may be the same as the proxy service component 150A-150N of FIGS. 1 and 2. As illustrated, the proxy service component 150 may include a service call component 310, a dependency identifying component 320, a node connection component 330, a proxy service providing component 340, a remote service request component 350, and a synchronization component 360. The proxy service component 150 may be coupled to memory 390 or any other suitable memory that stores data that can be used to implement various embodiments of the present disclosure. More or fewer components may be included without loss of generality. For example, two or more of the components or portions of the components may be combined into a single component, or one of the components may be divided into two or more modules. In one implementation, one or more of the modules may be executed by different processing devices on different computing devices (e.g., different server computers).

The service call component 310 may receive a call for a first service running on a first node in a distributed computing system, and the distributed computing system includes the first node and a second node.

The dependency identifying component 320 may detect that a first service calls (invokes) a second service and log the identities of the second service being called and the first service making the call in a dependency log. The dependency identifying component 320 may detect that a first service calls (invokes) a second service by searching in the dependency logs (e.g., one or more flat files), received dependency reports, and/or a dependency database. The dependency identifying component 320 may determine that the second service running on the second node is dependent of the first service.

The node connection component 330 may connect to one or more proxy service component running on other node(s) upon detecting that the first service calls the second service running on the other node(s). Responsive to identifying the second service running on the second node, the node connection component 330 may connect to the second node via a proxy service component running on the second node. The node connection component 330 may connect with the second node via an API.

The proxy service providing component 340 may provide a proxy service functioning as a proxy of the second service. The remote service request component 350 may send, via an API, to the second node, a request to start, stop, invoke the second service running on the second node and a request for specific data associated with the second service.

The remote service request component 350 may send via the API, to the proxy service component running on the second node, a request to start, stop, invoke the second service running on the second node. The remote service request component 350 may send via the API, the second service, a request for specific data associated with the second service.

The synchronization component 360 may receive a notification regarding a state (e.g., invoked state) of the second service. The synchronization component 360 may receive specific data associated with the second service.

Figure 4:
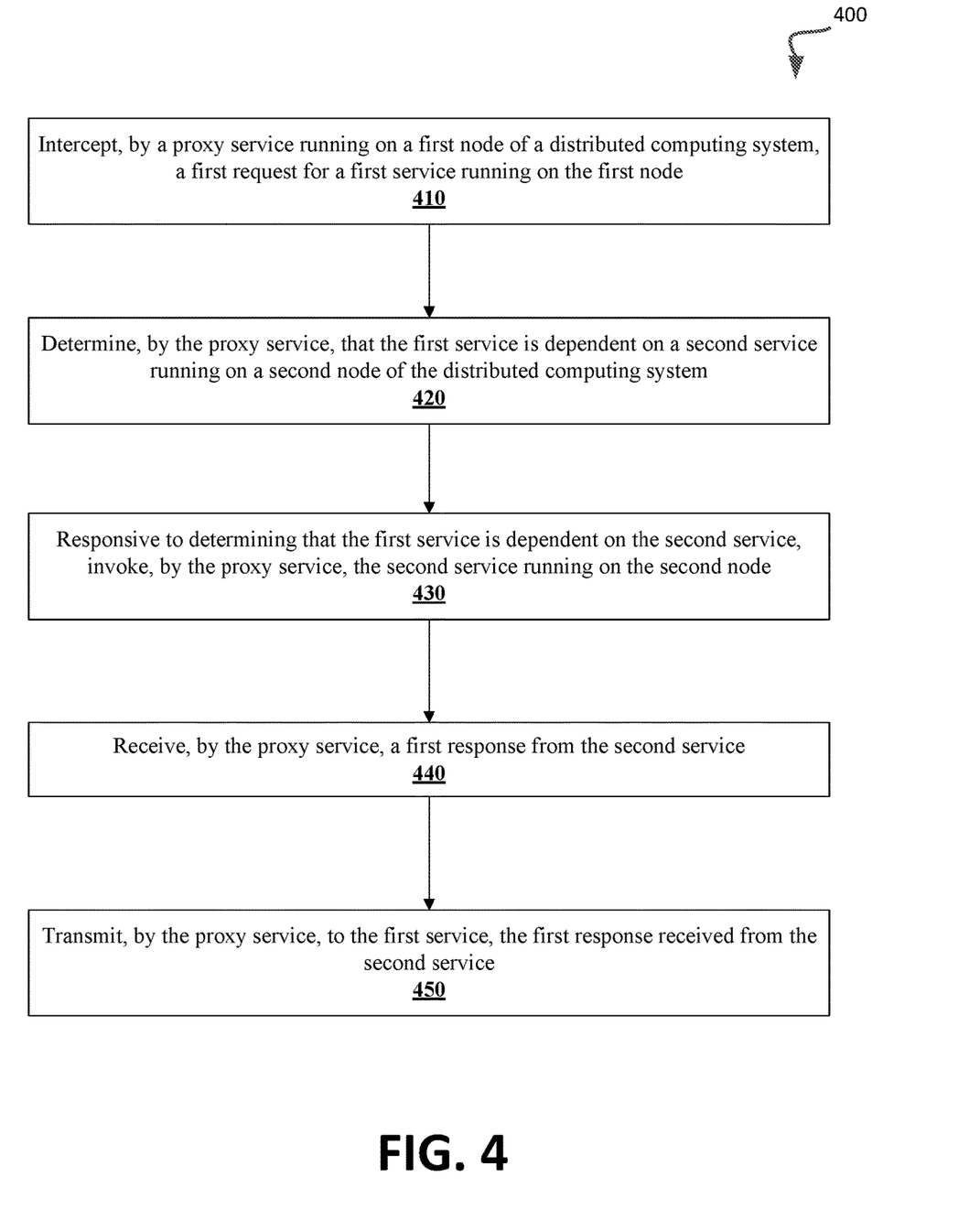
FIG. 4 depicts a flow diagram of example methods for using proxy services for dependencies in distributed computing systems, in accordance with one or more aspects of the present disclosure.

FIG. 4 depicts a flow diagram of an illustrative example of a method 400 for using proxy services for dependencies in distributed computing systems, in accordance with one or more aspects of the present disclosure. Method 400 and each of its individual functions, routines, subroutines, or operations may be performed by one or more processors of the computer device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

At operation 410, the processing logic intercepts, by a proxy service running on a first node of a distributed computing system, a first request for a first service running on the first node. In some implementations, the processing device receives a call for a first service running on a first node in a distributed computing system, and the distributed computing system includes the first node and a second node. The call may be intercepted by the proxy service for the communication with the second node.

At operation 420, the processing logic determines, by the proxy service, that the first service is dependent on a second service running on a second node of the distributed computing system. In some implementations, the processing logic identifies a second service running on the second node, where the second service is dependent of the first service. In some implementations, the processing logic may identify a dependency between the first service and the second service, where the dependency specifies that the first service requires the second service. In some implementations, the processing logic may identify a dependency between the first service and the second service, where the dependency specifies that the first service succeeds the second service for processing. In some implementations, the processing logic may retrieve, from a data structure or file (e.g., service definition file), e.g., stored in a data store, a dependency between the first service and the second service.

At operation 430, responsive to determining that the first service is dependent on the second service, the processing logic invokes, by the proxy service, the second service running on the second node. In some implementations, responsive to identifying the second service running on the second node, the processing logic connects, via a proxy service component running on the first node, to the second node. In some implementations, the processing logic connects the proxy service component to a second proxy service component running on the second node via an application programming interface (API).

At operation 440, the processing logic receives, by the proxy service, a first response from the second service. In some implementations, the processing logic sends, via the proxy service, a second request for data associated with the second service running on the second node. In some implementations, the processing logic creates a proxy service and sends the request through the proxy service. In some implementations, responsive to receiving the second request, the processing logic generates, by the second service, the first response comprising the data associated with the second service. In some implementations, the processing logic receives, via the proxy service, a notification regarding an invocation of the second service. In some implementations, the processing logic receives, via the proxy service, the first response comprising the data associated with the second service.

At operation 450, the processing logic transmits, by the proxy service, to the first service, the first response received from the second service. In some implementations, responsive to receiving the first response, the processing logic generates, by the first service, a second response to the first request for the first service.

Figure 5:
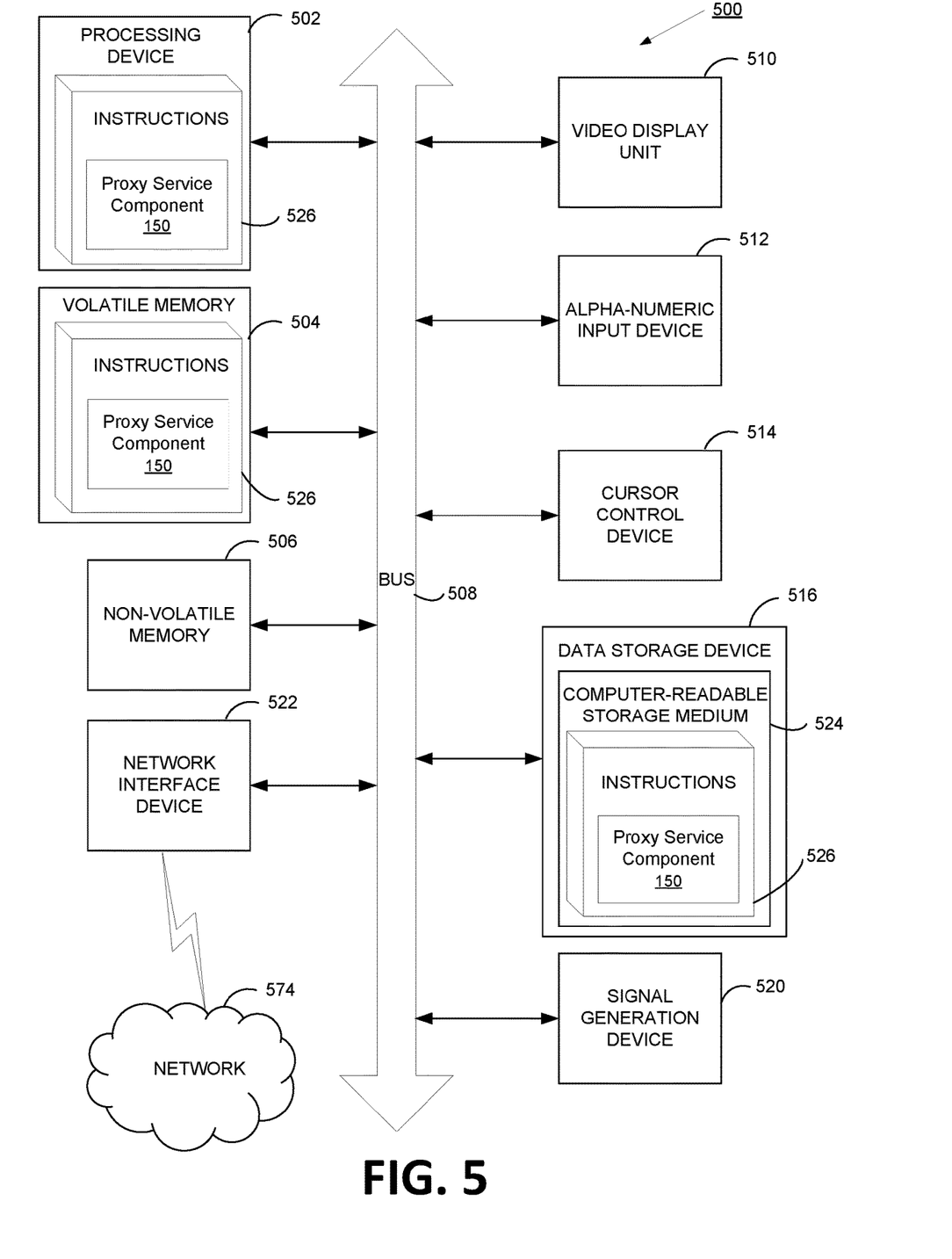
FIG. 5 depicts a block diagram of an example computer system operating in accordance with one or more aspects of the present disclosure.

FIG. 5 depicts an example computer system 500, which can perform any one or more of the methods described herein. In one example, computer system 500 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 500 includes a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application-specific integrated circuit (ASIC), a field-programmable gate array (FPGA), a digital signal processor (DSP), network processor, or the like. The processing device 502 is configured to execute processing logic (e.g., instructions 526) that includes the proxy service component 150 for performing the operations and steps discussed herein (e.g., corresponding to the method of FIG. 4, etc.).

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker). In one illustrative example, the video display unit 510, the alphanumeric input device 512, and the cursor control device 514 may be combined into a single component or device (e.g., an LCD touch screen).

The data storage device 516 may include a non-transitory computer-readable medium 524 on which may store instructions 526 that include proxy service component 150 (e.g., corresponding to the methods of FIG. 4, etc.) embodying any one or more of the methodologies or functions described herein. The proxy service component 150 may also reside, completely or at least partially, within the main memory 504 and/or within the processing device 502 during execution thereof by the computer system 500, the main memory 504, and the processing device 502 also constituting computer-readable media. The proxy service component 150 may further be transmitted or received via the network interface device 522.

While the computer-readable storage medium 524 is shown in the illustrative examples to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding, or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media. Other computer system designs and configurations may also be suitable to implement the systems and methods described herein.

Although the operations of the methods herein are shown and described in a particular order, the order of the operations of each method may be altered so that certain operations may be performed in an inverse order or so that certain operations may be performed, at least in part, concurrently with other operations. In certain implementations, instructions or sub-operations of distinct operations may be in an intermittent and/or alternating manner.

It is to be understood that the above description is intended to be illustrative and not restrictive. Many other implementations will be apparent to those of skill in the art upon reading and understanding the above description. Therefore, the scope of the disclosure should be determined with reference to the appended claims, along with the full scope of equivalents to which such claims are entitled.

In the above description, numerous details are set forth. However, it will be apparent to one skilled in the art that aspects of the present disclosure may be practiced without these specific details. In some instances, well-known structures and devices are shown in block diagram form rather than in detail in order to avoid obscuring the present disclosure.

Unless specifically stated otherwise, as apparent from the following discussion, it is appreciated that throughout the description, discussions utilizing terms such as "receiving," "determining," "providing," "selecting," "provisioning," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for specific purposes, or it may comprise a general-purpose computer selectively activated or reconfigured by a computer program stored in the computer. Such a computer program may be stored in a computer-readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general-purpose systems may be used with programs in accordance with the teachings herein, or it may prove convenient to construct a more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, the use of the words "example" or "exemplary" is intended to present concepts in a concrete fashion. As used in this application, the term "or" is intended to mean an inclusive "or" rather than an exclusive "or." That is, unless specified otherwise or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, the use of the term "an embodiment" or "one embodiment" or "an implementation" or "one implementation" throughout is not intended to mean the same embodiment or implementation unless described as such. Furthermore, the terms "first," "second," "third," "fourth," etc., as used herein, are meant as labels to distinguish among different elements and may not have an ordinal meaning according to their numerical designation.

What is claimed is:

1. A method comprising:
   intercepting, by a first proxy service running on a first node of a distributed computing system, a first request for a first service running on the first node, the first service being a service initiated by a system and service manager that executes as an initial process on the first node during a boot phase of the first node;
   in response to intercepting the first request, accessing, by the first proxy service, dependency information that identifies a dependency between the first service and a second service, the second service being a service initiated by a system and service manager that executes as an initial process on a second node during a boot phase of the second node;
   determining, by the first proxy service based on the dependency information, that the first service is dependent on the second service on the second node of the distributed computing system;
   responsive to determining that the first service is dependent on the second service, connecting, by the first proxy service, to a second proxy service running on the second node;
   sending, by the first proxy service to the second proxy service, a request to initiate the second service on the second node.

2. The method of claim 1, further comprising:
invoking, by the first proxy service via the second proxy service, the second service running on the second node;
receiving, by the first proxy service, a first response from the second service; and
transmitting, by the first proxy service to the first service, the first response received from the second service.

3. The method of claim 2, further comprising:
responsive to receiving the first response, generating, by the first service, a second response to the first request for the first service.

4. The method of claim 2, further comprising:
transmitting, by the first proxy service, to the second service, a second request for data associated with the second service.

5. The method of claim 4, further comprising:
responsive to receiving the second request, generating, by the second service, the first response comprising the data associated with the second service.

6. The method of claim 1, wherein the first proxy service runs as a background service.

7. A system comprising:
a memory; and
a processing device coupled to the memory, the processing device to perform operations comprising:
intercepting, by a first proxy service running on a first node of a distributed computing system, a first request for a first service running on the first node, the first service being a service initiated by a system and service manager that executes as an initial process on the first node during a boot phase of the first node;
in response to intercepting the first request, access, by the first proxy service, dependency information that identifies a dependency between the first service and a second service, the second service being a service initiated by a system and service manager that executes as an initial process on a second node during a boot phase of the second node;
determining, by the first proxy service based on the dependency information, that the first service is dependent on the second service on the second node of the distributed computing system;
responsive to determining that the first service is dependent on the second service, connecting, by the first proxy service, to a second proxy service running on the second node;
sending, by the first proxy service to the second proxy service, a irst request to initiate the second service on the second node.

8. The system of claim 7, wherein the operations further comprise:
invoking, by the first proxy service via the second proxy service, the second service running on the second node;
receiving, by the first proxy service, a first response from the second service; and
transmitting, by the first proxy service to the first service, the first response received from the second service.

9. The system of claim 8, wherein the operations further comprise:
responsive to receiving the first response, generating, by the first service, a second response to the first request for the first service.

10. The system of claim 8, wherein the operations further comprise:
transmitting, by the first proxy service, to the second service, a second request for data associated with the second service.

11. The system of claim 10, wherein the operations further comprise:
responsive to receiving the second request, generating, by the second service, the first response comprising the data associated with the second service.

12. The system of claim 7, wherein the first proxy service runs as a background service.

13. A non-transitory computer-readable storage medium comprising instructions that, when executed by a processing device, cause the processing device to perform operations comprising:
intercepting, by a first proxy service running on a first node of a distributed computing system, a first request for a first service running on the first node, the first service being a service initiated by a system and service manager that executes as an initial process on the first node during a boot phase of the first node;
in response to intercepting the first request, accessing, by the first proxy service, dependency information that identifies a dependency between the first service and a second service, the second service being a service initiated by a system and service manager that executes as an initial process on a second node during a boot phase of the second node;
determining, by the first proxy service based on the dependency information, that the first service is dependent on the second service on the second node of the distributed computing system;
responsive to determining that the first service is dependent on the second service, connecting, by the first proxy service, to a second proxy service running on the second node;
sending, by the first proxy service to the second proxy service, a request to initiate the second service on the second node.

14. The non-transitory computer-readable storage medium of claim 13, wherein the operations further comprise:
invoking, by the first proxy service via the second proxy service, the second service running on the second node;
receiving, by the first proxy service, a first response from the second service; and
transmitting, by the first proxy service to the first service, the first response received from the second service.

15. The non-transitory computer-readable storage medium of claim 14, wherein the operations further comprise:
responsive to receiving the first response, generating, by the first service, a second response to the first request for the first service.

16. The non-transitory computer-readable storage medium of claim 14, wherein the operations further comprise:
transmitting, by the first proxy service, to the second service, a second request for data associated with the second service.

17. The non-transitory computer-readable storage medium of claim 16, wherein the operations further comprise:
responsive to receiving the second request, generating, by the second service, the first response comprising the data associated with the second service.

* * * * *